Figure 1:
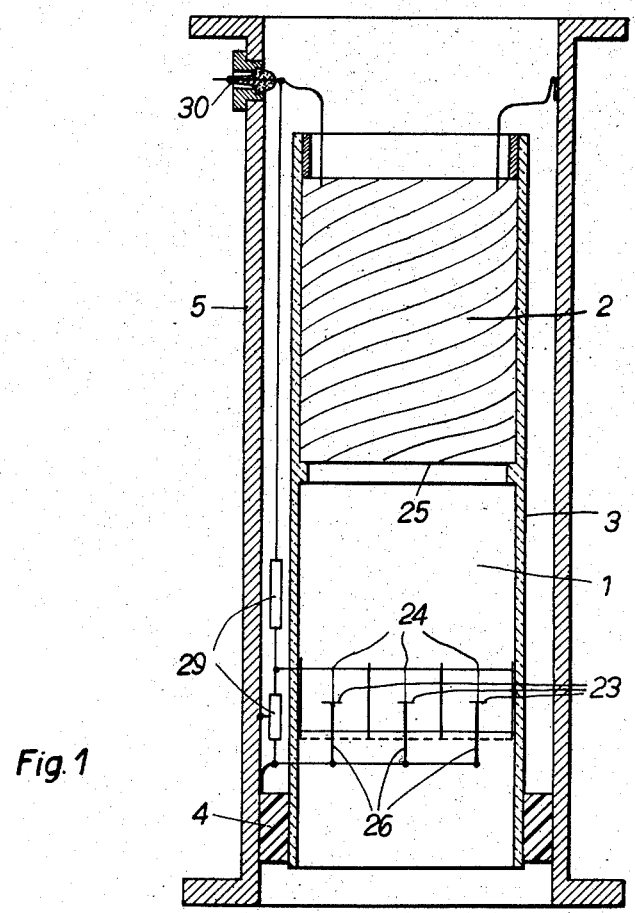

INVENTORS
FRIEDRICH J. MAAS
JOHANN SCHEDLING
BY:
ATTORNEYS

United States Patent Office 2,868,317
Patented Jan. 13, 1959

2,868,317

APPARATUS FOR ELECTRICALLY SEPARATING MATTER AND CONDENSATION CORES SUSPENDED IN A GAS

Friedrich Julius Maas, Zurich, Switzerland, and Johann Schedling, Vienna, Austria, assignors to G. A. Messen-Jaschin, Sarnen, Switzerland Application June 3, 1955, Serial No. 513,024

Claims priority, application Switzerland August 10, 1954

2 Claims. (Cl. 183—7)

The present invention relates to an apparatus by which a gas may be cleaned from suspended matter in an improved manner as compared with heretofore known separating means. It is a prime object of the present invention ot render possible with the same electrofilter, on the one hand, the cleaning of a substantially larger amount of gas per time unit and, on the other hand, also the separating of substantially smaller particles than were possible with heretofore known electrofilters. Thus the invention renders possible the separation of the smallest particle acting as condensation cores for the mist formation.

The applicants have already made possible the cleaning of a gas from such smallest particles which are not separated in usual electrofilters, by adding to the gas a vaporous means for condensation at the particles so as to increase the effective diameter of the latter and thus their inclination to separation. However, such a process, in addition to the additives necessitates more energy for the evaporation and condensation and special devices for its working. It is a further object of the apparatus according to the present invention to attain an increase of the particles volume without any additives but solely by the application of such features which in any case would be necessary for increasing the filter output with respect to the amount of gas to be cleaned.

The invention is based on the recognition that the separation of particles of similar type, dimension and charge, suspended in a gas is mainly dependent for constant electric field conditions in the electrode system, from the duration of the action of this field onto the particles. This duration or "stay time" is, for constant electrode dimensions, inversely proportional to the velocity of the particles. Long stay times, i. e. small velocities of stream, have the advantage of mostly laminar stream conditions with minor radial velocity fall, and help to reduce the current resistance in the separator due to the missing turbulence and increase of the probability of separation. Under equal conditions the stream velocity may be reduced by compressing the gas, as this velocity is inversely proportional to the pressure of the gas. There results therefrom a direct proportionality between stay time and gas pressure. The frictional forces acting onto the particles during their movement in the electric field vary according to the compression of the carrying gas owing to the independence of the inner friction from the pressure only when the compression produces substantial increasings of temperatures which, however, may easily be prevented.

In many cases the gas is already compressed but is used in expanded condition. In this case the filtering in the compressed condition according to the invention has substantial advantages as for similar filters under equal circumstances substantially better separating degrees are obtained or for an equal sepaarting degree substantially larger gas volumes may be cleaned by the filtering unit.

If the electrical charging of the suspended particles is produced by a radioactive ionizer it is necessary—for a cross-section of the charging space held constant—to compensate the reduction of range, which is inversely proportional to the pressure increase, by using a radioactive source of larger range. In place of such a source of larger range the charging space and the radioactive preparation could be divided by equally distributing over the sectional area of the charging space a plurality of ionizers.

The invention is further based on recognition that upon utilization of radioactive ionizers the electrical charging of the particles is influenced by the potential along the limiting walls of the charging space. For these reasons the walls are made of an insulating material and, from case to case according to the form of the electric field necessitated in the charging space, are provided on their inside partly with metallic layers serving as electrodes. If the gas is misted with a conductive liquid the walls are made of water-repellent material, for example silicon glass, or these walls are provided with a water-repellent cover.

Figure 1A:
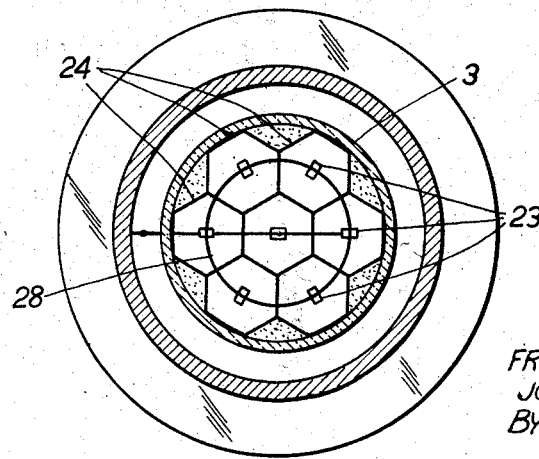
Figure 2:
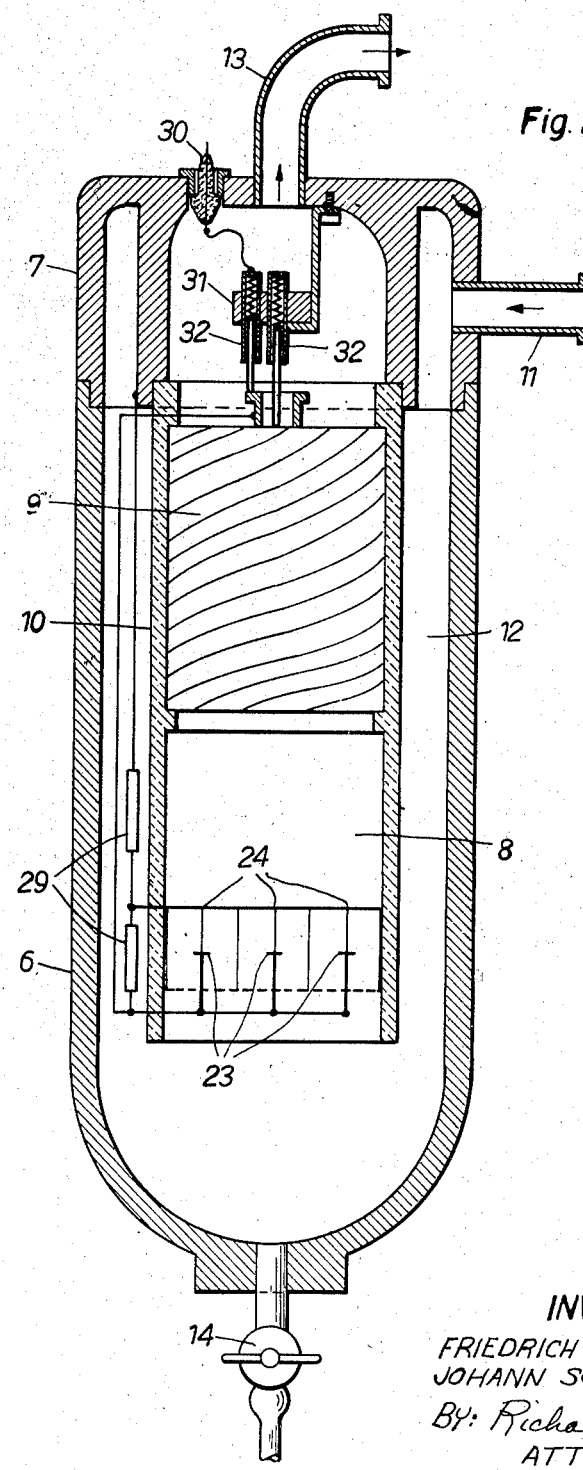
Figure 3:
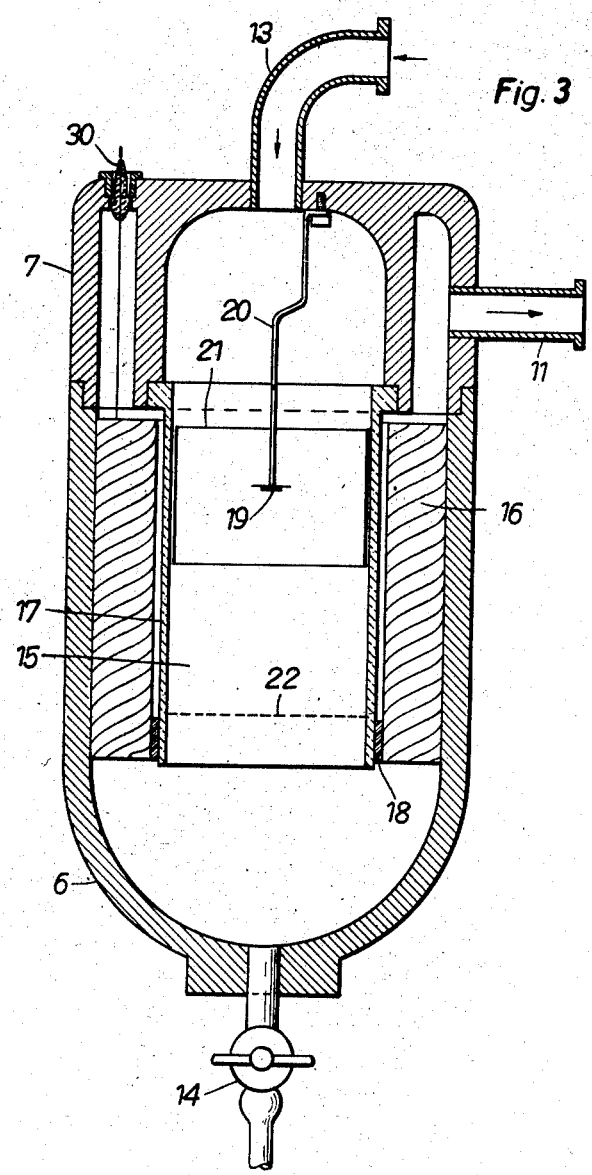

Other features and advantages of the invention will become apparent from the description now to follow, of preferred embodiments thereof, given by way of example and in which reference will be made to the accompanying drawings showing an apparatus according to the invention. In the drawings:

Fig. 1 is a longitudinal section through a first embodiment of such an apparatus, Fig. 1a is a section through the apparatus shown in Fig. 1, Fig. 2 is a similar section through a second embodiment, and Fig. 3 is still a similar section through a third embodiment.

In the apparatus illustrated in Fig. 1 the charging space 1 and the separating electrode system 2 are enclosed and limited, respectively, by a tube 3 of silicon glass gas-tightly mounted into a metallic pressure tube 5 over an intermediate ring 4. In the embodiment illustrated by Fig. 2 the metallic pressure tube 5 is replaced by a pressure cup 6 gas-tightly screwed into the head 7. The latter carries the insulating tube 10 enclosing the charging space 8 and the filter 9. The gas to be cleaned enters the intermediate space 12 at 11 and, subsequent to reversement of the direction of stream, flows through the inner part of the insulating tube thereby first traversing the changing space 8, then the filter 9 and finally the arrangement 13, leaving the latter in cleaned condition.

If the gas to be cleaned contains larger amounts of liquid particles the apparatus is preferably arranged vertically. In this position the smallest possible number of liquid particles deposits on the walls of the charging space and the liquid deposited on the electrodes in the filter may discharge simultaneously by flowing towards the lower electrode edge. Drops are formed there, which fall through the charging space and collect at the lowermost point of the cup 6. The collected liquid may be discharged through a cock 14.

Through the dripping of the liquid through the charging space the radioactive foil may under certain circumstances be covered with a liquid layer absorbing the ionizing radiation. This may be prevented as shown in Fig. 3 by feeding the gas through the centrally arranged charging space 15 from top to bottom (gas inlet at 13) and by arranging the separating electrode system in the annular space between the insulating tube 17 and the pressure cup 6. The packing rim 18 spaces the insulating tube from the electrode system.

In Fig. 3 the ionizer is constituted by a radioactive foil 19 arranged at the end of the central holding wire 20. The radiation field of the foil has practically the form of a cone whereby the top of the cone lies in the foil. It has been found that by means of the cylinder electrode 21 and the metallic net-electrode 22 an ion distribution in the charging space 15 may be obtained, which leads to unipolar charging of all suspended particles. According to the geometrical arrangement the potential differences between the foil 19 and the electrodes 21 and 22 should be chosen separately.

As it has further been found that the radius of tube 17 should not be made greater than the range of the radioactive source it is necessary, at the transition to higher gas pressures, to undertake a spatial division of the ionizers with simultaneous maintaining of the sectional area in view of the range of the source diminishing reciprocally with respect to the pressure. Such arrangement of the ionizers is shown in Fig. 1. In order to make effective the principle followed with Fig. 3 also at a pressure increase to three times the original pressure, seven ionizer foils 23 are provided in place of the one ionizer foil 19, each of said ionizer foils 23 being arranged on the axis of a comb electrode 24. The seven comb electrodes complete themselves to a honeycomb practically filling the sectional area of the tube 3. Together with the common net-electrode 25, which for example may be constituted by the front surface of the electrode filter 2 itself, the comb electrodes 24 as well as the cylinder electrode 21 in Fig. 3 serve to erect the already mentioned electric field above the ionizer foils. The foils 23 secured at the holding wires 26 are on the same potential applied through the holding ring 28, which at the same time also serves for mounting the foils.

The different electrodes may be connected with a resistance potential divider 29 so that the current supply is possible with a sole unilaterally earthed power source. The power supply is effected over the insulator 30 which preferably is arranged on the side traversed by the air in filtered condition. In the arrangement of Fig. 2 the power supply to the separating electrode system 9 is effected over spring contacts 32 inserted in insulating supports 31 in order to render possible the screwing out of the insulating tube 10 from the head 7 and to render possible exchange of the separating filter 9.

In order to separate liquid matter which, as will be shown later on, deposits easily with the described method, exchange of the filter according to Figs. 2 and 3 is not necessary as a self-cleaning of the whole filter is guaranteed when the distance between the electrodes of the separating system is chosen greater than the distance in which the liquid would just remain hanging under the acting capillarity.

In addition to this advantage of the described apparatus there is the further advantage already mentioned and residing in the fact that also the smallest particles are removed from the gas, which particles usually when the gas is saturated with vapor act as condensation cores for the formation of mist drops. By the compression the non-saturated vapor present in the gas is quickly saturated as the vapor pressure is increased at the same proportion as the gas pressure and thus the saturation vapor pressure corresponding to the temperature of the compressed gas is soon attained. It is easy to prove that in the pressure tank of a compressor there is always a 100% relative humidity, and that condensation of excess vapor appears at walls and condensation cores if the gas, previous to the compression, has a relative humidity at the temperature $t$ of:

$$\varphi < \frac{P}{p_K}\,\frac{\Pi_s(t_K)}{\Pi_s(t)}$$

Whereby $p$ is the gas pressure previous to the compression, $p_K$ the compression pressure, $\Pi_s(t)$ the saturation pressure for steam at the temperature $t$ of the gas previous to the compression and $\Pi_s(t_K)$ the saturation pressure for steam at the temperature $t_K$ of the compressed gas. Thus for example at an ambient temperature of $t=20°$ C. and a temperature of $t_K=27°$ C. of the compressed gas for a compression from 1 atm. to 5 atm. there would always be condensation when the relative humidity of the gas previous to the compression exceeds 31%.

As, with very few exceptions, the air of the atmosphere has a substantially higher humidity and air compressed to 4 atü. by a compressor would automatically be liberated from the above-mentioned smallest particles on which steam condenses at 100% relative humidity by a filter working under this pressure. Condensation on these cores is facilitated, as experience has shown, if the gas is cooled between the compressure and the pressure tank and is led, shortly before its entering into the pressure tank, through a neck behind which it is expanded. Thereby condensation at the walls of the tank is reduced and condensation on the cores is increased.

We claim:

1. An apparatus for electrically separating a matter from a gas in which it is suspended by compressing the gas and feeding it in compressed condition through an electrofilter, said apparatus comprising means forming a pressure space to be traversed by the gas and having an inlet and an outlet for the gas stream, an electrofilter mounted in said space, means forming an ionizer chamber near the inlet of said space, an ionizer located in said chamber and having a metallic base plate, layers of a radioactive preparation on said base plate, said layers radiating leewardly and serving as an ionizer for electrically charging the matter suspended in the gas stream, a wire axially extending into the insulating tube and serving to support said base plate, the dimensions of said preparation being small as compared with the radius of the insulating tube and the range of which, for the selected gas pressure, is not substantially smaller than the radius of the insulating tube, a cylinder electrode adjacent the inner wall of the insulating tube and a net-electrode insulated from said cylinder electrode and directed leewards into the gas stream, an electric field being erected above the base plate of the ionizer by means of said electrodes.

2. An apparatus for electrically separating a matter from a gas in which it is suspended by compressing the gas and feeding it in compressed condition through an electrofilter, said apparatus comprising means forming a pressure space to be traversed by the gas and having an inlet and an outlet for the gas stream, an electrofilter mounted in said space, means forming an ionizer chamber near the inlet of said space, an ionizer located in said chamber and having metallic base plates, a plurality of radioactive preparations arranged in layers on said metallic base plates and radiating leewards with respect to the gas stream, said preparations acting as ionizer for electrically charging the matter suspended in a sectional area the radius of which is substantially larger than the range of the used radioactive preparation for the selected gas-pressure, comb-like electrodes, axially extending holding wires, each of said radioactive preparations being arranged on the axis of one of said comb-like electrodes by means of one of said axial holding wires, and each of said preparations being of small dimension with respect to the dimension of the comb-like electrode, the separate comb-like electrodes constituting a honeycomb and filling in their totality substantially the whole cross-section of the insulating tube, an electric field being erected above each of the base plates by means of said comb-like electrodes and of a common net-electrode arranged leewardly in the gas stream.

References Cited in the file of this patent

UNITED STATES PATENTS

| | | | |
|---|---|---|---|
| 2,372,314 | Conetta | Mar. 27, | 1945 |
| 2,381,455 | Jacob | Aug. 7, | 1945 |
| 2,528,028 | Barry | Oct. 31, | 1950 |
| 2,593,869 | Fruth | Apr. 22, | 1952 |
| 2,615,530 | Hadron et al. | Oct. 26, | 1952 |

FOREIGN PATENTS

| | | | |
|---|---|---|---|
| 55,275 | Austria | Apr. 1, | 1912 |
| 402,423 | Great Britain | Nov. 23, | 1933 |